United States Patent [19]

Suzaki et al.

[11] 3,997,829
[45] Dec. 14, 1976

[54] MULTI-PHASE STEPPING MOTOR CONTROLLER

[75] Inventors: Masayuki Suzaki; Shigeyuki Araki, both of Tokyo, Japan

[73] Assignee: Ricoh Co., Ltd., Tokyo, Japan

[22] Filed: Nov. 19, 1974

[21] Appl. No.: 525,132

[30] Foreign Application Priority Data

Nov. 20, 1973 Japan .............................. 48-130540

[52] U.S. Cl. .............................................. 318/685
[51] Int. Cl.² ...................................... G05B 19/40
[58] Field of Search .......... 318/696, 685, 138, 254

[56] References Cited

UNITED STATES PATENTS

| | | | |
|---|---|---|---|
| 3,523,230 | 8/1970 | York | 318/603 |
| 3,586,953 | 6/1971 | Markkanen et al. | 318/685 |
| 3,694,725 | 9/1972 | Abraham et al. | 318/685 |
| 3,767,993 | 10/1973 | Yablonski | 318/685 X |
| 3,787,727 | 1/1974 | McSparran | 318/685 X |
| 3,849,714 | 11/1974 | Goretzki et al. | 318/685 |

*Primary Examiner*—Robert K. Schaefer
*Assistant Examiner*—John J. Feldhaus
*Attorney, Agent, or Firm*—Frank J. Jordan

[57] ABSTRACT

A disc rotatable with the motor shaft has circumferentially equally spaced slots formed therethrough between the motor step positions. A light source and receiver assembly are operatively arranged relative to the slots to produce position pulses when the motor shaft is positioned between steps. Since the motor shaft varies during operation, the widths of the position pulses also vary in proportion to the motor shaft speed. Timing pulse generators are arranged to generate timing pulses of fixed duration at various motor shafts spacings before the desired stopping position. The coincidence between the timing pulses and the position pulses is sensed, and the motor phases are switched to apply reverse torque to the motor shaft during the intervals of coincidence or non-coincidence of the timing pulses and position pulses. The intervals of coincidence or non-coincidence are proportional to the speed of the motor shaft since the pulse widths of the position pulses are proportional to the motor shaft speed and the pulse widths of the timing pulses are fixed. Reverse torque is thereby applied to the motor shaft in proportion to the motor shaft speed. The excitation power of the motor may be increased during the reverse torque periods, and also for a predetermined number of steps after the motor is initially excited.

13 Claims, 7 Drawing Figures

TIME ⟶

MULTI-PHASE STEPPING MOTOR CONTROLLER

The present invention relates to an improved method of driving a multi-phase stepping motor and a motor controller embodying the method.

Closed loop driving control methods and systems are known in the prior art for multi-phase stepping motors. This configuration provides accurate stopping of the motor at a desired step position and reduces hunting to a low level. The operation of such a system is therefore quite stable, and the motor may be driven at high rates of speed and acceleration. The range of applications of such a motor system is much greater than with an open loop stepping motor system.

Stepping motors, also called pulse motors, are becoming increasingly employed in industrial applications due to the introduction of digital pulse techniques. A stepping motor can produce an angular output which is proportional to the number of input pulses from a command device, and can also produce a rotational speed output which is proportional to the frequency of input pulses. Stepping motors are found in such applications as copy machine paper drives, printers, etc.

However, stepping motor control systems known in the prior art are disadvantageous in that the motor shafts, due to the inherent nature of an open loop control system, tend to oscillate in response to each input pulse. This phenomenon is particularly troublesome if the frequency of the input pulses is high and/or the frequency of the input pulses is closed to the oscillatory frequency of the motor shaft in response to the input pulses. Similarly, this phenomenon, known as hunting, can occur at the stopping position of the motor shaft to ruin the stability of the motor.

In addition, it has been very difficult to smoothly damp the stepping motor when the friction and output loads on the motor shaft vary using purely electrical means. For this reason, prior art stepping motors utilize magnetic brakes or other means to provide smoother damping. Other problems in the prior art involve the durability, operational noise and reliability of stepping motors.

It is therefore an important object of the present invention to provide a method of electrically controlling the drive of a multi-phase stepping motor which overcomes the above mentioned problems of the prior art and allows smooth damping of the motor shaft, high motor shaft rotationaal speed, and eliminates hunting.

It is another important object of the present invention to provide a multi-phase stepping motor controller embodying the above method.

The above and other objects, features and advantages of the present invention will become apparent from the following detailed description taken with the accompanying drawings, in which:

FIG. 2 is a timing diagram of the motor controller shown in FIG. 1a;

FIG. 3 is another timing diagram illustrating the operation of the motor controller shown in FIG. 1a;

FIG. 4 is a torque diagram illustrating the operation of the motor shown in FIG. 1a;

FIG. 5 is a circuit diagram of the motor and motor controller shown in FIG. 1a.

Figure 1A:
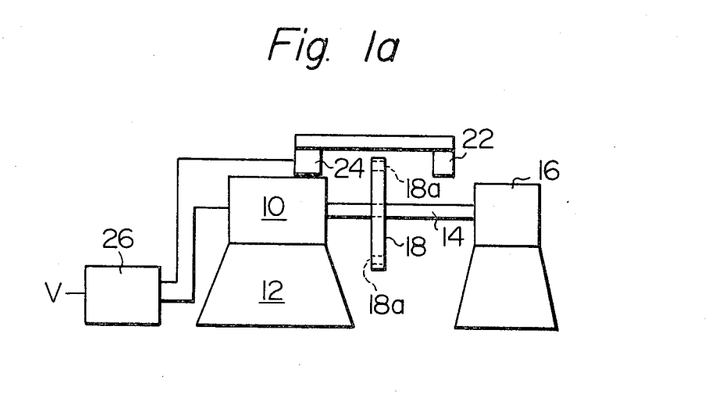
FIG. 1a is a longitudinal plan view of a four phase stepping motor, a load, and a motor controller embodying the present invention.
Figure 1B:
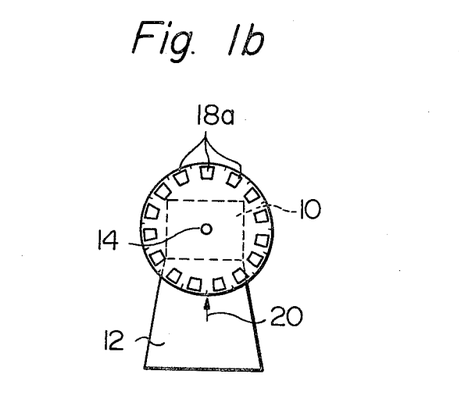
FIG. 1b is an elevational plan view of the motor shown in FIG. 1a and a disc mounted on the motor shaft.

Referring now to FIG. 1a, a 15 step, 4 phase stepping motor 10 of variable reluctance type is shown as mounted on a base 12. A motor shaft 14 of the motor 10 is connected to drive a load 16, which may be any suitable device. A disc 18 is mounted for rotation with the shaft 14, and is formed with 15 circumferentially equally spaced slots 18a. Each slot 18a is arranged halfway between two respective step positions of the motor shaft 14 as illustrated in FIG. 1b and indicated by an arrow mark 20 on the base 12.

A light source 22 and receiver 24 are mounted on top of the motor 10 at a distance from the center of the shaft 14 equal to the distance from the center of the shaft 14 to the center of the slots 18a of the disc 18. In operation, the receiver 24 produces an output signal or pulse B as the shaft 14 rotates each time a slot 18a passes between the source 22 and receiver 24.

Figure 5:
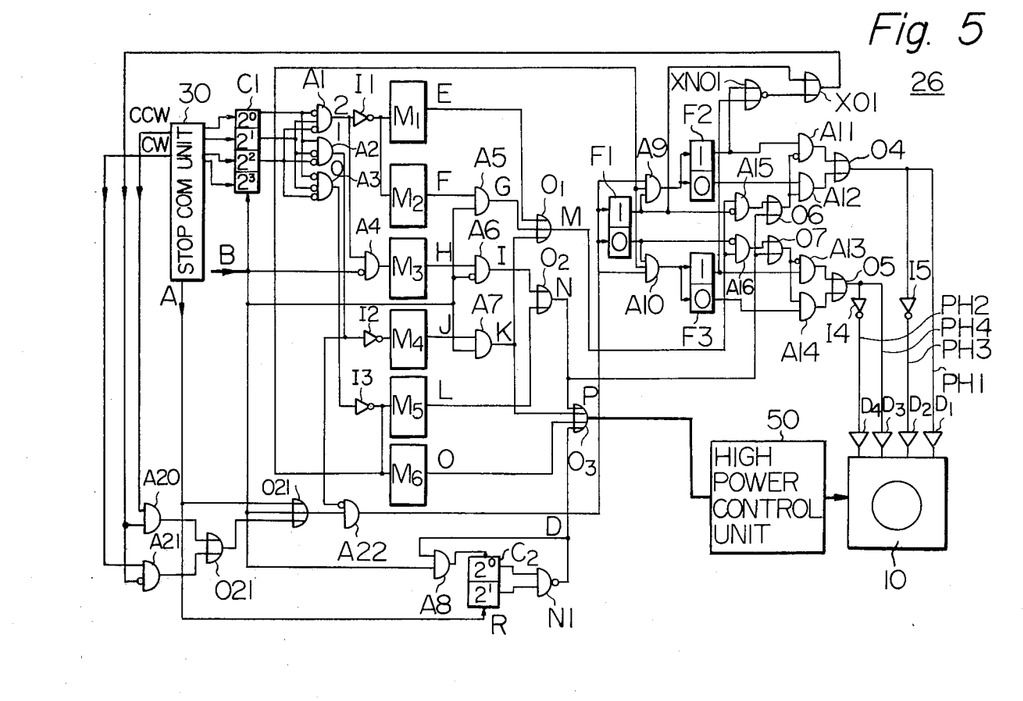

A motor controller 26 embodying the present invention is connected to the receiver 24 to receiver the pulses B, to a power source V (not shown) and to the motor 10 to control the same. An exemplary embodiment of the controller 26 is shown in FIG. 5, and comprises a step command unit 30 and a four bit binary down counter C1. The unit 30 may be any device such as a computer adapted to enter the number of steps which the motor shaft 14 is required to rotate into the counter C1 in binary form. The maximum count of the counter C1 is 15 (binary 1111), which is the number of steps of the stepping motor 10 (one complete revolution). A decoder (no numeral) consists of AND gates A1, A2 and A3. The output of the $2^0$ stage of the counter C1 is connected to an inverting input of the AND gate A1, an input of the AND gate A2 and an inverting input of the AND gate A3. The output of the $2^1$ stage of the counter C1 is connected to an input of the AND gate A1, and to inverting inputs of the AND gates A2 and A3. The output of the $2^2$ stage of the counter C1 is connected to inverting inputs of the AND gates A1, A2 and A3. One skilled in the art will immediately recognize that the AND gate A1 is adapted to detect the count 2 (binary 010) of the counter C1, the AND gate A2 the count of 1 (binary 001) and the AND gate A3 the count of 0 (binary 000) of the counter C1.

The output of the AND gate A1 is connected through an inverter I1 to inputs of timing pulse generators or monostable multivibrators M1 and M2, and directly to an input of an AND gate A4. The output of the AND gate A2 is connected through an inverter I2 to the input of a monostable multivibrator M4. The output of the AND gate A3 is connected through an inverter I3 to the input of a monostable multivibrator M5. The output of the inveter I3 is also connected to the input of a monostable multivibrator M6. The pulse B from the receiver 24 is fed to an inverting input of the AND gate A4 and also to the count input of the counter C1.

The output of the multivibrator M2 is connected to an input of an AND gate A5. The output of the multivibrator M3 is connected to an input of an AND gate A6. The output of the multivibrator M4 is connected to an input of an AND gate A7. The pulse B is fed to inputs of the AND gates A5 and A7, and to an inverting input of the AND gate A6. The output of the multivibrator M1, the AND gate A5 and the AND gate A7 are applied to inputs of an OR gate O1. The output of the AND gate A6 and the output of the multivibrator M5 are connected to inputs of an OR gate O2. The output of the OR gate O2, the output of the AND gate A7 and the output of the multibibrator M6 are applied to inputs of an OR gate O3.

The pulse B is applied to an input of an AND gate A8, the output of which is connected to the count input of a 2 bit binary up counter C2. A rotation start pulse A is produced by the step control unit 30 and applied to the reset input R of the counter C2. The outputs of both stages of the counter C2 are applied to inputs of a NAND gate N1, the output of which is connected to inputs of the OR gate O3 and the AND gate A8. The NAND gate N1 serves as a decoder to detect the count of 3 (binary 11) in the counter C2.

The pulses A and B are also applied to inputs of an OR gate O21, the output of which is connected to an input of an AND gate A22. The output of the AND gate A2 is connected to an inverting input of the AND gate A22. The output of the AND gate A22 is applied to trigger inputs of a flip-flop F1, and also to inputs of AND gates A9 and A10. The outputs of the "1" side and "0" of the flip-flop F1 are applied to other inputs of the AND gates A9 and A10 respectively. The output of the inverter I3 is connected to additional inputs of the AND gates A9 and A10. The outputs of the AND gates A9 and A10 are applied to trigger inputs of flip-flops F2 and F3 respectively.

The outputs of the "1" side and "0" side of the flip-flop F2 are connected to inputs of AND gates A11 and A12 respectively. The outputs of the 1 side and 0 side of the flip-flop F3 are connected to inputs of AND gates A13 and A14 respectively. The outputs of the AND gates A11 and A12 are connected to inputs of an OR gate O4. The outputs of the AND gates A13 and A14 are connected to inputs of an OR gate O5. The output of the OR gate O4 is connected directly to an input of a driver D1 for phase 1 of the motor 10, and through an inverter I5 to an input of a driver D2 for phase 3 of the motor 10. The output of the OR gate O5 is connected directly to a driver D3 for phase 4 of the motor 10, and through an inverter I4 to a driver D4 for phase 2 of the motor 10.

The output of the OR gate O1 is connected to inputs of AND gates A15 and A16. The outputs of the 1 side and 0 side of the flip-flop F1 are connected to inverting inputs of the AND gates A15 and A16 respectively. The outputs of the AND gates A15 and A16 are connected to inputs of OR gates O6 and O7 respectively. The output of the OR gate O2 is applied to inputs of the OR gates O6 and O7. The output of the OR gate O6 is applied to an inverting input of the AND gate A11 and to an input of the AND gate A12. The output of the OR gate O7 is applied to an inverting input of the AND gate A13 and to an input of the AND gate A14.

The output of the OR gate O3 is connected to a high power control unit 50, the output of which is connected to control the excitation power of the motor 10.

The outputs of the 1 sides of the flip-flops F2 and F3 are connected to inputs of an exclusive NOR gate XNO1, the output of which is connected to an input of an exclusive OR gate XO1. The output of the 1 side of the flip-flop F1 is connected to another input of the exclusive OR gate XO1. The output of the exclusive OR gate XO1 is connected to an input of an AND gate A20, and to an inverting input of an AND gate A21.

The motor 10 may be rotated in either the clockwise or forward direction or in the counterclockwise or reverse direction as desired. The step command unit 30 is therefore further operative to generate, prior to entering the desired number of steps into the counter C1, either a pulse CW indicating clockwise rotation or a pulse CCW indicating counterclockwise rotation. The pulse CW is fed to an input of the AND gate A21 whereas the pulse CCW is fed to an input of the AND gate A20. The outputs of the AND gates A20 and A21 are connected to inputs of an OR gate O20, the output of which is connected to an input of the OR gate O21.

The operation of the unit 26 will now be described with reference to FIGS. 2 and 5. It will be assumed that it is desired to rotate the motor shaft 14 clockwise by 7 steps, and that phases 1 and 2 (designated 1–2) of the motor 10 are initially excited to apply an electrical lock to the shaft 14. It will also be assumed that the previous stepping operation was in the clockwise direction.

The 1 side outputs of the flip-flops F1, F2 and F3 are high, high and low respectively. As will be understood from detailed description below, the outputs of the OR gates O1 and O2 are low, so that the outputs of the AND gates A15 and A16 and thereby the outputs of the OR gates O6 and O7 are also low. The AND gates A11 and A13 are thereby enabled, whereas the AND gates A12 and A14 are inhibited. The high output of the 1 side of the flip-flop F2 is gated through the AND gate A11 and OR gate O4 to enable the driver D1 and energize phase 1 of the motor 10. The high output of the OR gate O4 is inverted by the inverter I5 to inhibit the driver D2 and thereby inhibit phase 3 of the motor 10. The low output of the 1 side of the flip-flop F3 is applied to the input of the AND gate A13, which produces a low output. The OR gate O5 also produces a low output which is applied to the driver D3 to inhibit phase 4 of the motor 10. The low output of the OR gate O5 is inverted by the inverter I4 to enable the driver D4 and energize phase 2 of the motor 10. Thus, phases 1–2 of the motor 10 are initially energized to electrically lock the motor shaft 14.

The exclusive NOR gate XNO1, exclusive OR gate XO1, AND gates A20 and A21 and OR gate O20 are provided to control the flip-flops F1, F2 and F3 to produce rotation of the motor shaft in the desired clockwise or counterclockwise direction as will be described in detail below. Since the outputs of the 1 sides of the flip-flops F2 and F3 are high and low respectively, the output of the exclusive NOR gate XNO1 is low. Since the 1 side output of the flip-flop F1 is high, the output of the exclusive OR gate XO1 is high. The AND gates A20 and A21 are thereby enabled and inhibited respectively. As will be described in detail below, prior to a stepping operation the count in the counter C1 is zero so that the AND gate A3 produces a high output. This is inverted by the inverter I3 and applied to the inputs of the AND gates A9 and A10 to inhibit the same.

At the beginning of the stepping operation, the step command unit 30 generates a pulse CW and feeds the same to the input of the AND gate A21. However, since the AND gate A21 is inhibited as described above, the pulse CW is not gated through the AND gate A21 and the status of the flip-flops F1, F2 and F3 remains unchanged. The desired number of steps, which is 7 (binary 0111), is then entered into the counter C1. The output of the AND gate A3 becomes low, and is inverted by the inverter I3 to produce high inputs to the AND gates A9 and A10.

The outputs of the AND gates A1, A2 and A3 will remain logically low until the count of the counter C1 is reduced to 2 (binary 0010). The step command unit 30 then generates the pulse A shown in FIG. 2, which has the effect of resetting the counter C2. The NAND gate N1 produces a logically high output designated as D which is shown in FIG. 2. The output of the OR gate O3 is high and designated as P, and is applied to the high power control unit 50. The signal P is shown in FIG. 2 and is a high power signal which has the effect of causing excitation of the motor 10 at higher power than normal. The multivibrators M1 to M6 are inoperative until the count of the counter C1 is reduced to 2, so the outputs of the OR gates O1 and O2 remain low until such time. The flip-flops F1, F2 and F3 are of conventional design, and are adapted to be triggered by the downclock or negative going edge of an input trigger pulse.

Since the outputs of the OR gates O1 and O2 are low, the outputs of the AND gates A15 and A16, OR gates O6 and O7 and AND gates A12 and A14 are low and will remain low until the count in the counter C1 is reduced to 2. The AND gates A11 and A13 are enabled by the low outputs of the OR gates O6 and O7 respectively, so that the contents of the 1 side of the flip-flop F2 and the 1 side of the flip-flop F3 are gated therethrough respectively.

Since the output of the AND gate A2 is low, this low output is inverted by the inverting input of the AND gate A22 to enable the AND gate A22. The pulse A is gated through the OR gate O21 and AND gate A22 to the trigger inputs of the flip-flop F1 and to the inputs of the AND gates A9 and A10. Since the 1 side output of the flip-flop F1 is high, the pulse A is gated through the AND gate A9 to the trigger inputs of the flip-flop F2. However, since the 0 side output of the flip-flop F1 is low, the AND gate A10 is thereby inhibited and the pulse A is prevented from reaching the trigger inputs of the flip-flop F3. The pulse A thereby causes the flip-flops F1 and F2 to change state, but the state of the flip-flop F3 remains the same. The 1 side output of the flip-flop F1 becomes low.

The 1 side output of the flip-flop F2 becomes low, and the AND gate A11, and OR gate O4 apply a low input to the driver D1. This input is designated PH1, and since it is low, the driver D1 is inhibited and does not exite phase 1 of the motor 10. The low output of the OR gate O4 is inverted by the inverter I5 and applied to the input of the driver D2 to enable the same and excite phase 3 of the motor 10. This input is designated PH3.

The 1 side output of the flip-flop F3 remains low, and is applied as an input PH4 through the AND gate A13 and OR gate O5 to the driver D3 to inhibit the same. Phase 4 is therefore not excited. The low output of the OR gate O5 is inverted by the inverter I4 and applied to the input of the driver D4, designated PH2, to excite phase 2 of the motor 10. With phases 2–3 of the motor 10 excited the shaft 14 starts to rotate clockwise.

As the shaft 14 rotates, light from the source 22 passes through the first slot 18a of the disc 18, and the receiver 24 produces the first pulse B. The upclock of the first pulse B has no effect on the unit 26, but the downclock thereof decrements the count of the counter C1 to 6, increments the count of the counter C2 to 1, and causes the flip-flop F1 to change state. The output of the NAND gate N1 is still high, and is gated through the OR gate O3 to maintain the high power excitation of the motor 10. Since before the flip-flop F1 changed state its 1 side output was low, the AND gate A9 was inhibited so that the first pulse B did not reach the trigger inputs of the flip-flop F2. However, the 0 side output of the flip-flop F1 was high, and the first pulse B was gated through the AND gate A10 to cause the flip-flop F3 to change state. Since the state of the flip-flop F2 and AND gates A11 and A12 was unchanged, phase 3 will continue to be excited with phase 1 inhibited. However, since the output of the OR gate O7 is unchanged and the 1 side output of the flip-flop F3 becomes high, the output of the AND gate A13 becomes high so that phase 4 will be excited and phase 2 will be inhibited. The exitation status becomes 3–4 in response to the downclock of the first pulse B.

In response to the downclock of the second pulse B, the count in the counter C1 is decremented to 5 and the count in the counter C2 incremented to 2. Since the 1 side output of the flip-flop F1 was high, the AND gate A9 was enabled and the second pulse B gated therethrough to change the state of the flip-flop F2. Since the 0 side output of the flip-flop F1 was low, the AND gate A10 was inhibited and the second pulse B had no effect on the flip-flop F3. The flip-flop F1 itself is changed so the 0 side output becomes high. The 1 side outputs of the flip-flops F2 and F3 are both high, and phases 4–1 are excited.

In response to the third clock pulse B, the counter C1 is decremented to 4 and the counter C2 is incremented to 3. The output of the NAND gate N1 becomes low due to the two high inputs, and the signal D becomes low. The low signal D is applied through the OR gate O3 to the high power control unit 50 to cause the drivers D1 to D4 to excite the motor 10 with normal power. The output of the NAND gate N1 is also applied to the input of the AND gate A8 to inhibit the same. The status of the counter C2 and NAND gate N1 will remain unchanged until another pulse A is applied from the step command unit 30 for the next stepping operation of the motor 10.

In response to the third pulse B, the flip-flops F1 and F3 are changed so that the 1 side outputs of the flip-flops F1, F2 and F3 become high, high and low respectively. As a result, phases 1–2 are excited.

In response to the fourth pulse B, the counter C1 is decremented to 3 and the flip-flops F1 and F2 are changed so that the 1 side outputs of the flip-flops F1, F2 and F3 are all low. As a result, phases 2–3 are excited.

In response to the downclock of the fifth pulse B, the counter C1 is decremented to 2 and the flip-flops F1 and F3 are changed so that the 1 side outputs of the flip-flops F1, F2 and F3 are high, low and high respectively. The normal excitation phase corresponding to this combination is 3–4. However, the multivibrators M1 and M2 are triggered by the fifth pulse B. Specifically, as the count in the counter C1 is decremented to 2 by the fifth pulse B, the AND gate A1 produces a high output which is applied to the inverter I1. The output of the inverter I1 goes from high to low triggering the multivibrators M1 and M2. The multivibrators M1 and M2 produce output signals or pulses designated as E and F, which are shown in FIGS. 2 and 5. After the downclock of the fifth pulse B, the pulse B input to the AND gate A5 becomes low, so the AND gate A5 is inhibited and the output of the multivibraotr M2 is not gated therethrough. The output of the multivibrator M1, however is gated through the OR gate O1 and designated as a signal M. The signal M is applied to the inputs of the AND gates A15 and A16 enabling the same. Since the output of the 1 side of the flip-flop F1 is high, this high signal is inverted by the inverting input of the AND gate A15 so that the outputs of the AND gate A15 and OR gate O6 are low. The output of the 1 side of the flip-flop F2, which is low, is applied through the AND gate A11 and OR gate 04 in the normal manner to excite phase 3.

On the other hand, the 0 side output of the flip-flop F1 is low, and is inverted by the inverting input of the AND gate A16. The AND gate A16 produces a high output, which is gated through the OR gate O7 and applied to the inverting input of the AND gate A13 and the input of the AND gate A14. The AND gate A13 is thereby inhibited whereas the AND gate A14 is enabled. The 0 side output of the flip-flop F3, which is low, is gated through the AND gate A14 and OR gate O5 to excite phase 2 of the motor 10. Thus, the phases, 2–3 of the motor 10 are excited rather than the normal phases 3–4. It will be noticed that this corresponds to an advance of 3 steps clockwise in the phase excitation sequence of the motor 10, or equivalently to a regression or retardation of one step, and the effect is to apply a reverse torque to the motor shaft 14 to decelerate or brake the same.

Figure 2:
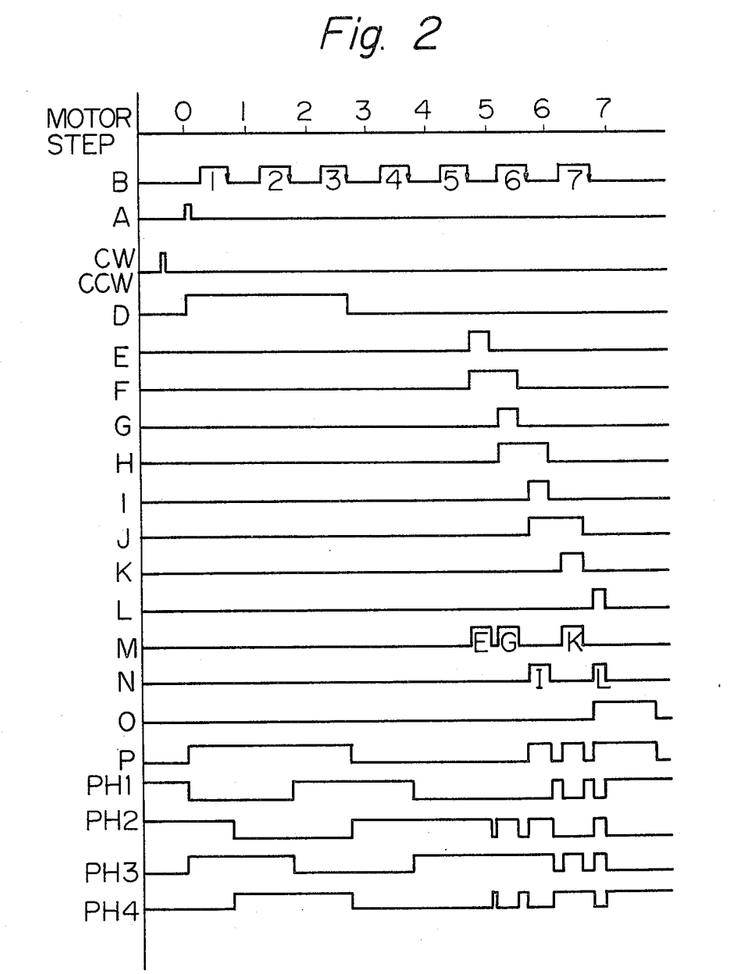

In the example shown in FIG. 2, the pulse width of the pulse E is selected to have a predetermined value in dependence on the operating speed of the motor shaft at which torque is imparted to the motor shaft to decelerate the shaft. The pulse width of the pulse F produced by the multivibrator M2 is considerably longer than the pulse width of the pulse E produced by the multivibrator M1. The pulse width of the pulse F may be selected to be longer than the interval between the downclock of the fifth pulse B and the upclock of the sixth pulse B at the lowest operating speed of the motor 10. In this case, the pulse G will always be produced. Although not shown, the width of the pulse F may be shorter than the interval between the downclock of the fifth pulse B and the upclock of the sixth pulse B at the lowest operating speed of the motor shaft 14. In this case, the pulse G is produced when the motor shaft 14 speed is above a predetermined value greater than the lowest operating speed of the motor shaft 14. As mentioned above, the AND gate A5 is inhibited because the status of the pulse B is such that the downclock of the fifth pulse B has occurred and the upclock of the sixth pulse B has not yet occurred. This low value of the pulse B inhibits the AND gate A5. With the occurrence of the upclock of the sixth pulse B, the AND gate A5 is enabled and produces the output G shown in FIG. 2 until the occurrence of the downclock of the pulse F, at which time the AND gate A5 is again inhibited to produce a low output. An important feature of the present invention resides in the operation just described. It will be understood that the higher the rotational speed of the motor shaft 14, the smaller the interval between the downclock of the fifth pulse B and the upclock of the sixth pulse B. By the same reasoning, the higher the speed of the motor shaft 14, the greater the overlap or interval of coincidence between the pulse F and the sixth pulse B, since the pulse width of the pulse F is fixed. The pulse width of the pulse G is therefore proportional to the rotational speed of the motor shaft 14. The pulse G is gated through the OR gate O1 in a manner identical to the pulse E and designated as the signal M. It will be noticed that after the termination of the pulse E, the signal M returns to a low level inhibiting the AND gates A15, A16, A12 and A14 and enabling the AND gates A11 and A13 so that the phase excitation is returned to 3–4. With the occurrence of the pulse G, the effect identical to that produced by the pulse E occurs, and the phase excitation is again changed to 2–3.

It will further be noticed that with the upclock of the sixth pulse B, the count in the counter C1 is still 2 since the counter C1 is triggered only by downclocks of pulses. The output of the AND gate A1 is high, and is applied to the AND gate A4, which was previously enabled by the negative value of the signal B applied through the inverting input of the AND gate A4. With the upclock of the sixth pulse B, the AND gate A4 is inhibited and its output goes from high to low triggering the multivibrator M3, which produces a pulse H which is similar to the pulse F. This pulse H is applied to the AND gate A6. The AND gate A6, however, is inhibited since the value of the signal B is high and is inverted by the inverting input of the AND gate A6. The output of the AND gate A6 is low. In response to the downclock of the sixth pulse B, the AND gate a6 is enabled and produces an output pulse I which is gated through the OR gate O2 and designated as a signal N. Also in response to the downclock of the sixth pulse B, the flip-flops F1 and F2 are changed to designate the phase excitation 4-1. However, the signal N resulting from the pulse I is gated through the OR gates O6 and O7 to inhibit the AND gates A11 and A13 and enable the AND gates A12 and A14. The low outputs of the 0 sides of the flip-flops F2 and F3 are gated through the AND gates A12 and A14 and the OR gates O4 and O5 respectively to change the phase excitation to 2–3. This is a change of 2 steps in the phase excitation sequence (either forward or backward), and results in a very high reverse torque being applied to the motor shaft 14 to decelerate the same. The pulse I will terminate with the occurrence of the trailing edge of the pulse H, since the AND gate A6 will be inhibited.

Still further in response to the downclock of the sixth pulse B, the count in the counter C1 is decremented to 1 and the AND gate A2 produces a high output which is inverted by the inverter I2 and triggers the multivibrator M4. The output of the multivibrator M4 is designated as a pulse J and is applied to the AND gate A7. The AND gate A7 will produce a low output since the signal B has gone low. With the upclock of the seventh pulse B, the AND gate A7 will be enabled to produce an output signal or pulse K, which is gated through the OR gate O1 and designated again as M. Since the 1 side output of the flip-flop F1 is low, the AND gate A15 will be enabled by the low output of the 1 side of the flip-flop F1 applied to the inverting input of the AND gate A15 and the signal M, and produces a high output which is gated through the OR gate O6 to enable the AND gate A12 and inhibit the AND gate A11. The 0 side output of the flip-flop F2, which is low, is applied through the AND gate A12 and OR gate O4 to change the phase excitation to 3–4. This is a change of 3 steps forward or one step backward. The pulse K will terminate with the downclock of the pulse J in a manner similar to the pulses G and I, and the phase excitation will be restored to 4-1.

It will be noticed that since the count in the counter C1 is 1 in response to the sixth pulse B, the output of the AND gate A2 is high and is inverted by the inverting input of the AND gate A22 to inhibit the AND gate A22. As a result, the seventh pulse B is prevented from passing through the AND gate A22 and does not affect the flip-flops F1, F2 and F3. The normal phase excitation remains 4-1. However, the count in the counter C1 goes to zero in response to the downclock of the seventh pulse B so that the AND gate A3 produces a high output which is inverted by the inverter I3 to produce a negative going pulse to trigger the multivibrators M5 and M6. The multivibrator M6 produces a pulse O which is gated through the OR gate O3 to the high power control unit 50 to energize the motor 10 at high power. As shown in FIG. 2, the pulse O may continue afteer the motor shaft 14 has reached its final stopping position (step 7) as will be described below. The pulse L may terminate when the motor shaft 14 reaches the final position. The pulse L is gated through the OR gate O2, and has the same effect as the pulse I in that it causes the excitation phases of the motor 10 to be advanced by 2 steps. As a result, the excitation is changed to 2–3.

When the motor shaft shaft 14 reaches the seventh step, the pulse L terminates so that the excitation changes back to 4–1. Phases 4–1 are excited at high power until the termination of the pulse O to apply an electrical lock to the motor shaft 14, and at normal power thereafter until the beginning of the next stepping operation.

The operation of selecting the desired direction of rotation of the shaft 14 will now be described with reference to the following table.

TABLE

| Excited motor phases | Rotation direction | F1 output | F2 output | F3 output | XN01 output | X01 output |
|---|---|---|---|---|---|---|
| 1-2 | CW | high | high | low | low | high |
| 2-3 | CW | low | low | low | high | high |
| 3-4 | CW | high | low | high | low | high |
| 4-1 | CW | low | high | high | high | high |
| 1-2 | CCW | low | high | low | low | low |
| 2-3 | CCW | high | low | low | high | low |
| 3-4 | CCW | low | low | high | low | low |
| 4-1 | CCW | high | high | high | high | low |

In the table, the motor phases are those normally excited with the flip-flops F1, F2 and F3 in specified states. The rotation directions designated CW (clockwise) and CCW (counterclockwise) are those which will result if pulses are applied through the AND gate A22 with the flip-flops F1, F2 and F3 in the specified states shown. The flip-flop F1, F2 and F3 outputs are those of the 1 sides. It will be noticed that each of the eight possible combinations of the states of the flip-flops F1, F2 and F3 designates a specific one of the eight possible combinations of motor phase excitation states and rotation directions, with no duplications or omissions. It will also be noticed that the outputs of the flip-flops F2 and F3 designate the excited motor phases whereas the output of the flip-flop F1 designates the direction of rotation. For example, with phases 1–2 excited, the outputs of the flip-flops F2 and F3 are high and low respectively. However, in the case of an applied pulse producing clockwise rotation, the output of the flip-flop F1 is high whereas in the counterclockwise case the output of the flip-flop F1 low.

It will also be noticed that in all of the clockwise cases, if the output of the flip-flop F1 is high, the outputs of the flip-flops F2 and F3 are different (one of the outputs of the flip-flops F2 and F3 is high whereas the other is low). In the clockwise case, if the output of the flip-flop F1 is low, the outputs of the flip-flops F2 and F3 are the same (both high or both low).

In all counterclockwise cases, these relations are reversed. If the output of the flip-flop F1 is high, the outputs of the flip-flops F2 and F3 are the same, whereas if the output of the flip-flop F1 is low, the outputs of the flip-flops F2 and F3 are different. These relationships make it possible to determine if the status of the flip-flops F1, F2 and F3 designates clockwise or counterclockwise rotation.

The exclusive NOR gate XNO1 will produce a high output if the outputs of the flip-flops F2 and F3 are the same, and a low output if they are different. The exclusive OR gate XO1 will produce a high output if the output of the flip-flop F1 and the output of the exclusive NOR gate XNO1 are different, and a low output if they are the same. As shown in the table, the output of the exclusive OR gate XO1 will be high in all cases in which the status of the flip-flops F1, F2 and F3 designate clockwise rotation, and low in all cases of counterclockwise rotation.

As mentioned above, it is desired to rotate the motor shaft 14 in a desired clockwise or counterclockwise direction by one step from an initial position in response to the pulse A, and the clockwise or counterclockwise pulse CW or CCW is generated followed by setting the number of steps into the counter C1 followed by generating the pulse A. Since at the end of the previous stepping operation the count in the counter C1 was reduced to zero, the high output of the AND gate A3 is inverted and applied to the AND gates A9 and A10 to inhibit the same. Thus, a pulse applied through the AND gate A22 under these conditions will cause only the flip-flop F1 to change state since the pulse is prevented from reaching the trigger inputs of the flip-flops F2 and F3 by the inhibited AND gates A9 and A10. Such a pulse will therefore only affect the designated direction of rotation of the shaft 14 and not the excitation status of the motor phases.

Assuming that the flip-flops F1, F2 and F3 are in a clockwise status, the high output of the exclusive OR gate XO1 is applied to the input of the AND gate A20 and to the inverting input of the AND gate A21 thereby enabling the AND gate A20 and inhibiting the AND gate A21. If it is desired to rotate the shaft 14 in the clockwise direction, the clockwise pulse CW is fed from the step command unit 30 to the input of the AND gate A21. However, since the AND gate A21 is inhibited, the pulse CW has no effect on the flip-flops F1, F2 and F3. This is the desired result, since because the flip-flops F1, F2 and F3 are already in a clockwise status, and it is not desired to change them. If, however, the flip-flops F1, F2 and F3 are in a counterclockwise status, the output of the exclusive OR gate XO1 is low and is inverted by the inverting input of the AND gate A21 to enable the AND gate A21. In this case, the pulse CW is gated through the AND gate A21, OR gates O20 and O21 and AND gate A22 to the trigger inputs of the flip-flop F1 to change the status from counterclockwise to clockwise. The AND gate A20 will similarly gate a counterclockwise pulse CCW therethrough if the flip-flops F1, F2 and F3 are in a clockwise status and a block a pulse CCW if the flip-flops F1, F2 and F3 are already in a counterclockise status. When the number of steps is entered into the counter C1, the output of the AND gate A3 becomes low so that the AND gates A9 and A10 are enabled to allow a normal stepping operation as described above.

Counterclockwise rotation of the motor shaft 14 will now be described. It will be assumed that the initial outputs of the flip-flops F1, F2 and F3 are low, high and low respectively, designating phases 1–2 and counterclockwise rotation as shown in the table. In response to the pulse A, the flip-flops F1 and F3 change state so that the outputs of the flip-flops F1, F2 and F3 become all high designating phases 4–1 and counterclockwise rotation. In response to the first pulse B, the flip-flops F1 and F2 change state so that the outputs of the flip-flops F1, F2 and F3 become low, low and high respectively to designate phases 3–4 and counterclockwise rotation. In response to the second pulse B, the flip-flops F1 and F3 change state so that the outputs of the flip-flops F1, F2 and F3 become high, low and low respectively designating phases 2–3 and counterclockwise rotation. In response to the third pulse B, the flip-flops F1 and F2 change state so that the outputs of the flip-flops F1, F2 and F3 become low, high and low respectively designating phases 1–2 and counterclockwise rotation. Application of additional pulses B will produce identical results to those just described. If, with the outputs of the flip-flops F1, F2 and F3 low, high and low respectively designating phases 1–2 and counterclockwise rotation, the signal M is produced, due to the high output of the 0 side of the flip-flop F1, the gating states of the AND gates A13 and A14 will remain unchanged so that phase 2 will continue to be excited. However, the low output of the 1 side of the flip-flop F1 will cause the AND gate A15 to produce a high output which is gated through the OR gate O6 to inhibit the AND gate A11 and enable the AND gate A12. The 0 side output of the flip-flop F2, which is low, is thereby applied through the AND gate A12 and OR gate O4 to excite phase 3. The result is an advance of three excitation phases in the counterclockwise direction.

If, with the outputs of the flip-flops F1, F2 and F3 low, high and low respectively designating phases 1–2 and counterclockwise rotation, the signal N is produced, the AND gates A11 and A13 are inhibited and the AND gates A12 and A14 are enabled. As a result, the 0 side outputs of the flip-flops F2 and F3, which are low and high, are gated through the AND gates A12 and A14 respectively to designated phases 3–4, an advance of 2 excitation steps in the counterclockwise direction. Application of the signal M or N will cause an advance of 3 or 2 steps respectively in the counterclockwise direction as desired with the outputs of the flip-flops F1, F2 and F3 in any counterclockwise status. The various combinations will not be described individually in detail to avoid essentially repetitive disclosure.

Reference will now be made to the OR gate O3. As described above, the signal D from the NAND gate N1 was gated through the OR gate O3 during the first three steps of the stepping motor 10 to increase the excitation power of the motor 10 to accelerate the motor shaft 14 and provide faster operation of the motor 10. The signals N, K and O are also gated through the OR gate O3 (the composite signal is designated as P) to produce increased power excitation during times when reverse torque is being applied to the motor shaft 14 to decelerate the same. This compensates for the high acceleration produced previously, and provides extremely fast operation of the motor 10.

Figure 3:
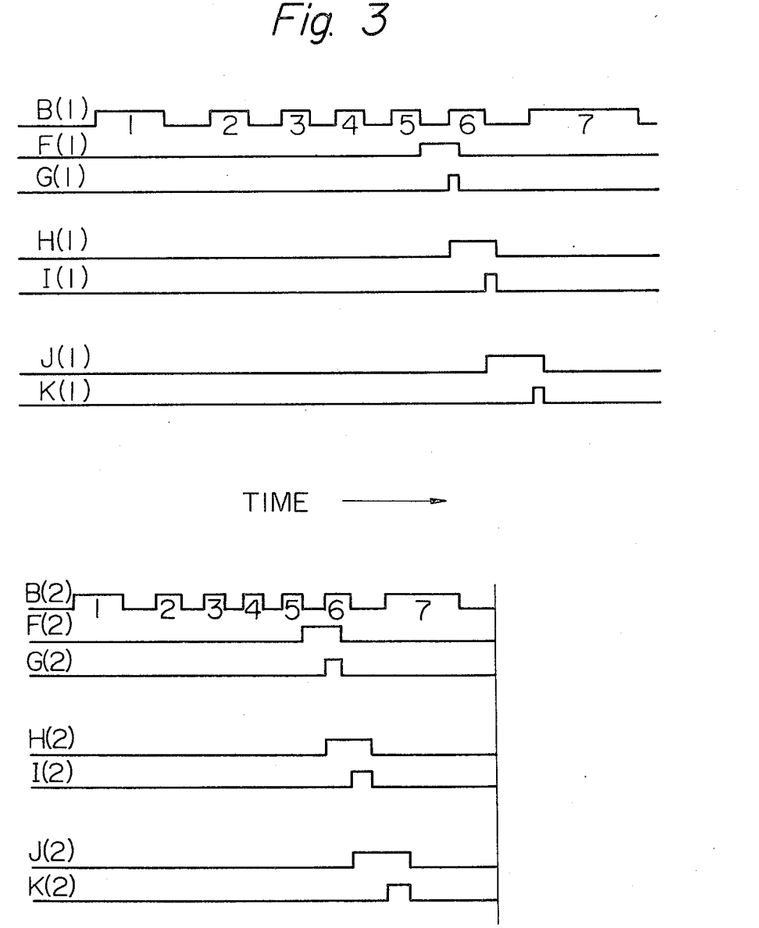

An important novel feature of the present invention will now be described with reference to FIG. 3. In FIG. 2, the pulses B are shown as having the same width, and the spacing between the pulses B is shown as the same. In actual operation, this is not the case, because the motor shaft 14 is initially accelerated, rotated for a period at constant speed, and then decelerated to a stop. The pulses B(1) shown in FIG. 3 result from operation of the motor 10 without the provision for increasing the excitation power during acceleration and deceleration. The first and seventh pulses B(1) are naturally the longest since the motor shaft 14 is moving at the lowest speed at the beginning and end of a stepping operation. In the example shown, the motor shaft 14 is accelerated during the time of the first to third pulses B(1), rotated at constant speed during the fourth and fifth pulses B(1) and decelerated during the sixth and seventh pulses B(1). It will be noticed that the widths of the pulses G(1), I(1) and K(1) are relatively short, and the motor shaft 14 is subjected to reverse torque for relatively short periods of time.

The pulses B(2) result from operation of the motor 10 with the provision of high excitation power during acceleration and deceleration. It will be noticed that the total time of the stepping operation has been substantially reduced, and that the widths of the pulses B(2) are shorter than the corresponding pulses B(1), indicating higher rates of speed, acceleration and deceleration. The important point is that the pulse widths of the pulses G(2), I(2) and K(2) are wider than the corresponding pulses G(1), I(1) and K(1) by an amount proportional to the difference in the rotational speed of the motor shaft 14 in the two respective examples. The reverse torque is applied to the motor shaft 14 for time intervals proportional to the rotational speed of the motor shaft 14, and effective electrical damping of the motor shaft 14 is obtained which effectively eliminates the phenomenon of hunting. The operation of the system is virtually independent of the frictional and output loads of the motor shaft 14, since variation of the load will effect the speed of the motor shaft 14 and will be automatically compensated for by the controller 26.

Figure 4:
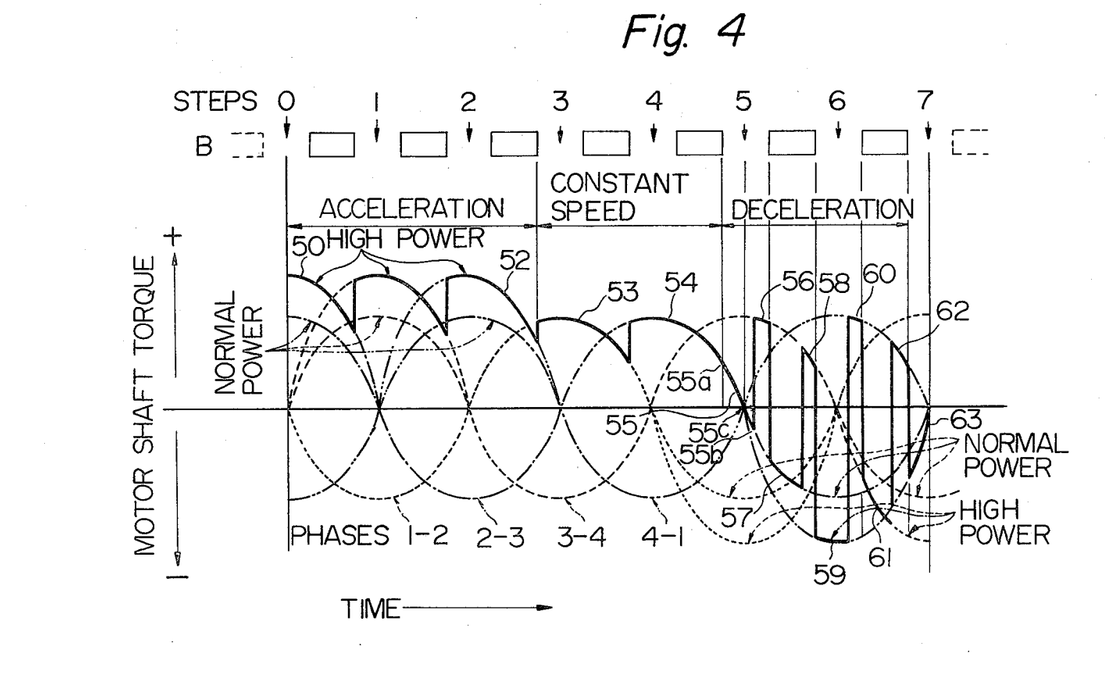

Reference will now be made to FIG. 4, which illustrates the torque applied to the motor shaft 14 as a function of time. In the drawing, the excitation phases are designated as 1–2, 2–3, 3–4 and 4–1 as above, and a thick solid curve designates the resultant torque curve of the motor shaft 14 as a result of the selective excitation of the motor phases as described above with reference to FIGS. 2 and 5. It will be assumed that all curve portions are bounded by the adjacent vertical lines unless therewise stated.

If a start signal A is generated when the motor shaft remains stopped position while the motor phases 1–2 are excited, the motor phases 2–3 are then excited at high power to produce a curve portion 50 of the thick solid curve. This torque is positive and accelerates the motor shaft 14. With the downclock of the first pulse B, the phase excitation is switched to 3–4, which is also high power in the positive region and further accelerates the motor shaft 14 as illustrated by a curve portion 51. The downclock of the second pulse B has the same effect, and excites phases 4–1 at high power as illustrated by a curve portion 52.

With the downclock of the third pulse B, phases 1–2 are excited at normal power to produce positive torque to drive the motor shaft 14 at constant speed, as illustrated by a curve portion 53. The downclock of the fourth pulse B causes excitation of the phases 2–3 at normal power and positive torque producing constant motor shaft 14 speed as illustrated by a curve portion 54.

In response to the downclock of the fifth pulse B, the normal phase excitation is 3-4. However, due to the effect of the pulse E, the phase excitation is advanced by three steps to 2-3, as illustrated by a curve portion 55 bounded by points 55a and 55b. The result is a forward torque in the region of the curve portion 55 between the points 55a and 55c and a negative torque in the region of the curve portion 55 between the points 55c and 55b, which decelerate the motor shaft 14. With the termination of the pulse E, the normal phase excitation 3-4 is restored as illustrated by a curve portion 56 resulting in positive torque to continue rotation of the motor shaft 14.

With the occurrence of the upclock of the sixth pulse B, the pulse G is initiated which again causes the phase excitation to change to 2-3 as illustrated by a curve portion 57. This curve portion 57 lies completely in the negative torque region, and the result is further deceleration of the motor shaft 14. With the downclock of the pulse F, the pulse G is terminated and the phase excitation is restored to the normal combination 3-4 as illustrated by a curve portion 58.

Upon occurrence of the downclock of the sixth pulse B, the normal phase excitation is 4-1. However, due to the effect of the pulse I, the excitation is changed to 2-3 and applied at high power as illustrated by a curve portion 59. The result is a very high reverse or negative torque being applied to the motor shaft 14. With the occurrence of the downclock of the pulse H, the pulse I is terminated and the phase excitation is restored to the normal combination 4-1 as illustrated by a curve portion 60.

With the upclock of the seventh pulse B, the pulse K is produced and the phase excitation is changed to 3-4 as illustrated by a curve portion 61. This excitation is also applied at high power and results in high deceleration of the motor shaft 14. With the downclock of the pulse J, the pulse K is terminated and the phase excitation is restored to the normal combination 4-1 resulting in positive torque as illustrated by a curve portion 62.

With the downclock of the seventh pulse B, the normal excitation is 4-1 since the seventh pulse B does not affect the flip-flops F1, F2 and F3 as described above. However, due to the effect of the pulse L, the excitation is changed to 2-3 and applied at high power. The resulting reverse torque causes the motor shaft 14 to stop at the seventh step position. Termination of the pulse L causes the excitation to change back to 4-1 to electrically lock the motor shaft 14.

Figure 6:
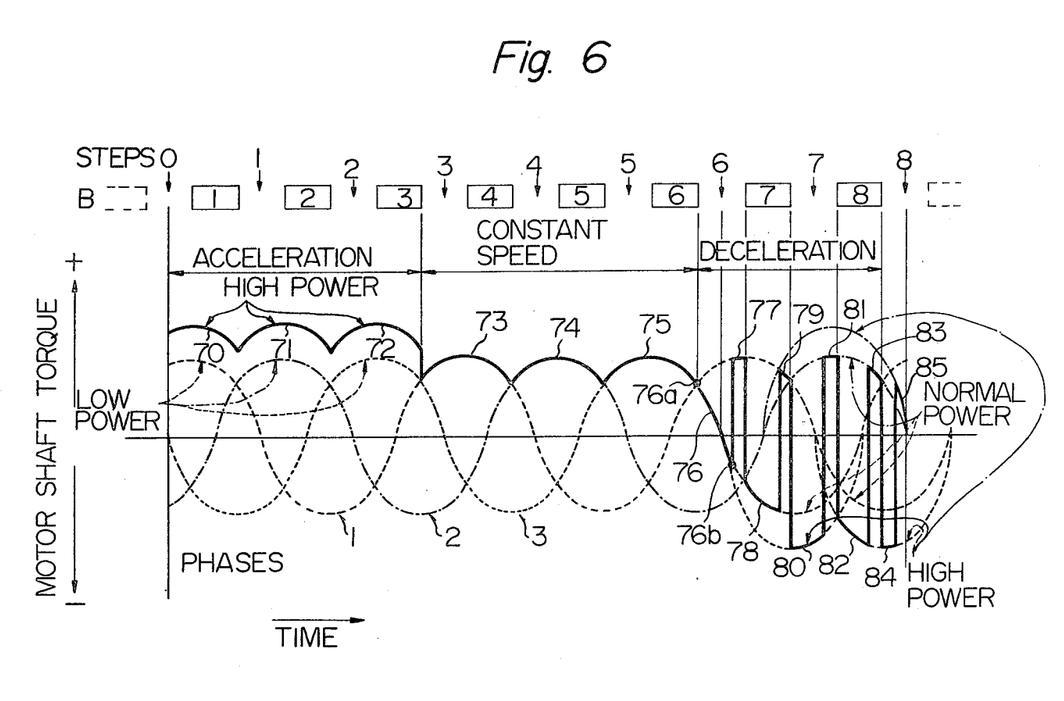
FIG. 6 is similar to FIG. 4 but illustrates the operation of a three phase stepping motor.

FIG. 6 is similar to FIG. 4, but shows the torque curve for a three phase stepping motor. The motor and its controller are simply modifications of the motor 10 and controller 26, and are not shown. The motor is driven by sequentially exciting the phases 1, 2 and 3 one at a time. In addition, it is desired that the motor shaft rotate by 8 steps.

In response to the start pulse A and the downclocks of the first and second pulses B, phases 1, 2 and 3 are sequentially excited at high power to accelerate the motor shaft as illustrated by curve portions 70, 71 and 72 respectively. In response to the downclocks of the third, fourth and fifth pulses B, the phases 1, 2 and 3 are again excited but at normal power to drive the motor shaft at constant speed as illustrated by curve portions 73, 74 and 75 respectively. In response to the downclock of the sixth pulse B, the normal excitation phase is 1, but phase 3 is excited to produce deceleration due to the effect of the pulse E as illustrated by a curve portion 76 bounded by points 76a and 76b. With the termination of the pulse E, the normal excitation phase 1 is restored as illustrated by a curve portion 77. In response to the pulse G, the excitation is again changed to phase 3 as illustrated by a curve portion 78. With the termination of the pulse G, the excitation is again restored to the normal phase 1 as illustrated by a curve portion 79.

In response to the downclock of the seventh pulse B, the normal excitation phase is phase 2, but due to the effect of the pulse I, the phase is changed to phase 3 at high power to produce high reverse torque as illustrated by a curve portion 80. With the termination of the pulse I, the phase is restored to the normal phase 2 as shown by a curve portion 81. In response to the pulse K, the excitation is changed to phase 1 at high power to produce strong deceleration as shown by a curve portion 82. With the termination of the pulse K, the excitation is restored to phase 2 as shown by a curve portion 83.

In response to the eighth pulse B, the normal phase excitation is phase 2, since the last or eighth pulse B is prevented from affecting the flip-flops of the controller (not shown). However, due to the effect of the pulse L, the excitation is changed to phase 1 at high power as shown by a curve portion 84. In this three phase motor, an additional modification is disclosed in that the pulse L is adapted to terminate before the final step as shown by a curve portion 85. In this case, during the final ¼ step of the motor shaft rotation, a high reverse torque is applied to the shaft (curve portion 84) followed by a low forward torque (curve portion 85) which drops to zero at the final stopping step 8 position. This provides smooth stopping of the three phase motor at the desired step position and electrical locking.

Referring back to FIG. 2, it will be understood that the signal M is composed of the pulse E, G and K which cause the four phase motor to be excited at a phase advanced 3 sequence steps from the normal excitation. Similarly, the signal N composed of the pulses I and L causes a phase advance of 2 sequence steps. The signal P, composed of the pulses D, I, K, L and O is a high power signal to the high power control unit 50 to cause excitation of the motor 10 at high power. The reverse torque produced by the generation of the pulses E, G, I, K and L is illustrated as being first applied when the counter C1 is decremented to 2, indicating that the motor shaft 14 is 2.25 steps ahead of the desired stopping position. This arrangement is exemplary only, and any other operable combination of the pulses and their timing may be employed within the scope of the present invention. Furthermore, the motor controller 26 shown in FIG. 5 and the disc 18, source 22 and receiver 24 are exemplary, and may be replaced by any apparatus providing the same or other required functions.

While, in the illustrated embodiment, the pulse B has been shown and described as being a positive pulse, it may be noticed that the pulse B may be negative, if desired. Although the disc 18 has been shown and described as being formed with circumferentially equally spaced slots 18, it is to be noted that the space between adjacent slots 18 may be unequally divided.

Also, it is to be appreciated that the motor controller may be modified to have a circuit in which the AND gate A5 further has an input terminal which is connected to the output terminal of the AND gate A1 by which, if the pulse width of the pulse F becomes longer than the downclock of the fifth pulse B and the upclock of the seventh pulse B, the pulse G produced during the time of coincidence of the seventh pulse B and the pulse F is inhibited.

It is also to be understood that the motor controller may be further provided with a circuit connection interconnecting the input terminal of the AND gates A6 and the output terminal of the AND gate A2 by which, if the pulse width of the pulse H becomes longer than the interval between the upclock of the sixth pulse B and the downclock of the seventh pulse B, the pulse I produced during the time interval between the termination of the seventh pulse B and the termination of the pulse H is inhibited. Likewise, the input terminal of the AND gate A7 may be connected to the output terminal of the AND gate A2, by which the pulse K produced when the pulse width of the pulse J becomes excessively longer is inhibited.

What is claimed is:

1. In a method of driving a multi-phase stepping motor, the motor having excitation means to sequentially excite motor phases to drive the motor and a pulse generator operatively associated with a motor shaft to generate position pulses indicating the motor shaft position, the position pulses being generated for respective motor steps and being initiated at a first angular spacing relative to the respective motor steps and being terminated at a second angular spacing relative to the respective motor steps, the improvement comprising the steps of:
   a. generating a timing pulse of a predetermined duration at a predetermined motor shaft spacing before a desired stopping step;
   b. sensing for coincidence of the timing pulse and the position pulses; and
   c. controlling the excitation means to change the phase excitation of the motor to impart torque to the motor shaft to decelerate the shaft during a time interval determined by a duration of coincidence of the timing pulse and one of the position pulses.

2. In a method according to claim 1, in which the predetermined motor shaft spacing is selected so that the timing pulse is initiated after a position pulse preceding said one of the position pulses is terminated and before said one of the position pulses is initiated, the time interval being that of the duration of coincidence of the timing pulse and said one of the position pulses.

3. In a method according to claim 1, in which the predetermined motor shaft spacing is selected so that the timing pulse is initiated after said one of the position pulses is initiated and before said one of the position pulses is terminated, the time interval being that between termination of said one of the position pulses and termination of the timing pulses.

4. In a method according to claim 1, further comprising the steps of:
   d. generating a second timing pulse of a predetermined duration at a second predetermined motor shaft spacing before the desired stopping step; and
   e. imparting torque to the motor shaft to decelerate the motor shaft during the duration of the second timing pulse.

5. In a method according to claim 1, in which step (c) comprises increasing an excitation power of the motor.

6. In a method according to claim 1, further comprising the step of:
   f. increasing an excitation power of the motor for a predetermined number of motor steps before performing step (a).

7. In a multi-phase motor controller having excitation means to sequentially excite motor phases to drive the motor and a position pulse generator operatively associated with the motor to generate position pulses indicating motor shaft positions, the position pulses being generated for respective motor steps and being initiated at a first angular spacing relative to the respective motor steps and being terminated at a second angular spacing relative to the respective motor steps, the improvement comprising:
   sensing means including a timing pulse generator to generate a timing pulse at a predetermined motor shaft spacing before a desired stopping step and gate means operative to sense for coincidence of the timing pulse and one of the position pulses, the gate means being further operative to produce an electric signal during a time interval determined by said coincidence; and
   control means responsive to the electric signal from the gate means and operative to control the excitation means to change the phase excitation of the motor to impart torque to the motor shaft to decelerate the motor shaft in response thereto.

8. In a multi-phase motor controller according to claim 7, in which the predetermined motor shaft spacing is selected so that the timing pulse is initiated after a position pulse preceding said one of the position pulses is terminated and before said one of the position pulses is initiated, the time interval being that of coincidence of the timing pulse and said one of the position pulses.

9. In a multi-phase motor controller according to claim 7, in which the predetermined motor shaft spacing is selected so that the timing pulse is initiated after said one of the position pulses is initiated and before said one of the position pulses is terminated, the time interval being that between termination of said one of the position pulses and termination of the timing pulse.

10. In a multi-phase motor controller according to claim 7, in which the control means is actuated by the electric signal to retard the motor phase excitation by two sequence steps to impart torque to the motor shaft to decelerate the motor.

11. In a multi-phase motor controller according to claim 7, in which the control means is actuated by the electric signal to retard the motor phase excitation by one sequence step to impart torque to the motor shaft to decelerate the motor shaft.

12. In a multi-phase motor controller according to claim 7, further comprising:
   power control means controlled by the control means and operative to increase an excitation power of the motor while the torque is being imparted to the motor shaft to decelerate the motor shaft.

13. In a multi-phase motor controller according to claim 7, further comprising:
   power control means to increase an excitation power of the motor for a predetermined number of motor steps after the motor is initially excited.

* * * * *